(12) United States Patent
Ryden

(10) Patent No.: US 10,694,798 B2
(45) Date of Patent: Jun. 30, 2020

(54) THERMAL INSULATING MATERIAL AND METHOD

(71) Applicant: BLIZZARD PROTECTION SYSTEMS LTD., Bethesda Gwynedd (GB)

(72) Inventor: Derek Ryden, Gloucestershire (GB)

(73) Assignee: Blizzard Protection Systems Ltd., Bethesda Gwynedd (GB)

( * ) Notice: Subject to any disclaimer, the term of this patent is extended or adjusted under 35 U.S.C. 154(b) by 0 days.

(21) Appl. No.: 15/979,393

(22) Filed: May 14, 2018

(65) Prior Publication Data

US 2019/0343202 A1    Nov. 14, 2019

(51) Int. Cl.
*A41D 31/00* (2019.01)
*A47G 9/02* (2006.01)
(Continued)

(52) U.S. Cl.
CPC ....... *A41D 31/065* (2019.02); *A41D 13/1245* (2013.01); *A41D 31/02* (2013.01);
(Continued)

(58) Field of Classification Search
CPC .. A41D 31/065; A41D 31/02; A41D 13/1245; A41D 2500/52; A41D 2500/30;
(Continued)

(56) References Cited

U.S. PATENT DOCUMENTS 3,439,491 A * 4/1969 Scruggs .................. D01D 5/34
57/5

4,446,189 A * 5/1984 Romanek ............... A41D 31/02
428/152

(Continued)

FOREIGN PATENT DOCUMENTS

WO    WO-0000051 A1 *  1/2000   .......... A41D 31/065
WO    2018083452 A1    5/2018

OTHER PUBLICATIONS

Nazan et al. 'Fiber Selection for the Production of Nonwovens'. In:Non-woven Fabrics. Edited by Han-Yong Jeon Mar. 24, 2016 (33 pages).

(Continued)

*Primary Examiner* — David Sample
*Assistant Examiner* — Donald M Flores, Jr.
(74) *Attorney, Agent, or Firm* — Roach, Brown, McCarthy & Gruber, P.C.; Kevin D. McCarthy (57) ABSTRACT

An insulating material and a method using that material for preventing perioperative hypothermia in hospital patients. Hospital blankets, hospital gowns and thermal wraps are made with the insulating material, which comprises in one embodiment an inner layer and an outer layer of a nonwoven material and a middle layer of a polymer laminate material. The nonwoven material is a bicomponent coextruded spunbond nonwoven polypropylene and polyethylene textile and the polymer laminate material comprises polyethylene and metallised polyethylene terephthalate. The nonwoven material is arranged with an elastic such that the insulating material can change between a first configuration wherein the elastic is stretched such that the primary material lies adjacent to it, and a second configuration wherein the elastic is relaxed such that the primary material is bowed with respect to it, forming at least one cavity for entrapping air.

36 Claims, 4 Drawing Sheets

(51) Int. Cl.
| | |
|---|---|
| *A47G 9/08* | (2006.01) |
| *A41D 13/12* | (2006.01) |
| *D04H 3/007* | (2012.01) |
| *D02G 3/36* | (2006.01) |
| *D04H 3/16* | (2006.01) |
| *D04H 3/018* | (2012.01) |
| *D02G 3/32* | (2006.01) |
| *B32B 27/32* | (2006.01) |
| *B32B 27/08* | (2006.01) |
| *B32B 5/02* | (2006.01) |
| *B32B 7/12* | (2006.01) |
| *B32B 3/26* | (2006.01) |
| *B32B 27/36* | (2006.01) |
| *A41D 31/06* | (2019.01) |
| *A41D 31/02* | (2019.01) |

(52) U.S. Cl.
CPC ............ *A47G 9/0223* (2013.01); *A47G 9/08* (2013.01); *B32B 3/266* (2013.01); *B32B 5/022* (2013.01); *B32B 5/028* (2013.01); *B32B 7/12* (2013.01); *B32B 27/08* (2013.01); *B32B 27/32* (2013.01); *B32B 27/36* (2013.01); *D02G 3/328* (2013.01); *D02G 3/36* (2013.01); *D04H 3/007* (2013.01); *D04H 3/018* (2013.01); *D04H 3/16* (2013.01); *A41D 2400/10* (2013.01); *A41D 2500/30* (2013.01); *A41D 2500/52* (2013.01); *B32B 2250/24* (2013.01); *B32B 2255/10* (2013.01); *B32B 2255/205* (2013.01); *B32B 2262/0253* (2013.01); *B32B 2307/51* (2013.01); *B32B 2437/00* (2013.01); *B32B 2535/00* (2013.01); *D10B 2501/04* (2013.01); *D10B 2503/06* (2013.01); *D10B 2509/00* (2013.01); *Y10T 428/24446* (2015.01)

(58) Field of Classification Search
CPC .... A41D 2400/10; A47G 9/0223; A47G 9/08; B32B 27/36; B32B 3/266; B32B 7/12; B32B 5/022; B32B 5/028; B32B 27/08; B32B 27/32; B32B 2535/00; B32B 2255/205; B32B 2262/0253; B32B 2250/24; B32B 2255/10; B32B 2307/51; B32B 2437/00; D02G 3/328; D02G 3/36; D04H 3/018; D04H 3/16; D04H 3/007; D10B 2503/06; D10B 2501/04; D10B 2509/00; Y10T 428/24446
USPC .......................................... 156/183; 428/152
See application file for complete search history.

(56) References Cited

U.S. PATENT DOCUMENTS

| | | | | |
|---|---|---|---|---|
| 4,606,964 | A | * | 8/1986 | Wideman ............... A41D 31/02 428/152 |
| 5,623,888 | A | * | 4/1997 | Zafiroglu ................. D04H 1/52 112/414 |
| 5,674,270 | A | * | 10/1997 | Viltro ........................ A61F 7/03 607/108 |
| 5,769,993 | A | * | 6/1998 | Baldauf .................. B32B 5/022 156/164 |
| 2003/0134094 | A1 | * | 7/2003 | Zafiroglu .................. B32B 3/28 428/198 |
| 2004/0010837 | A1 | * | 1/2004 | Graves ............... A41D 13/1245 2/114 |
| 2005/0127057 | A1 | * | 6/2005 | Rock ...................... H05B 3/342 219/211 |
| 2007/0226903 | A1 | * | 10/2007 | Paul ........................ A47G 9/086 5/413 R |
| 2008/0021530 | A1 | | 1/2008 | Castellani et al. |
| 2010/0255277 | A1 | * | 10/2010 | Platt ........................ B32B 7/12 428/215 |

OTHER PUBLICATIONS

International Search Report for PCT/IL2019/050542, dated Aug. 15, 2019, 4 pages.

* cited by examiner

THERMAL INSULATING MATERIAL AND METHOD

CROSS REFERENCE TO RELATED APPLICATION

None

STATEMENT REGARDING FEDERALLY SPONSORED RESEARCH OR DEVELOPMENT

This invention is not the result of federally sponsored research.

REFERENCE TO SEQUENCE LISTING, A TABLE, OR A COMPUTER PROGRAM LISTING, OR A COMPACT DISK APPENDIX

None

BACKGROUND

1. Field of the Invention

The present invention relates to a thermal insulating material particularly suitable for blankets and clothing to prevent heat-loss, and most particularly for use in hospital blankets and hospital gowns to prevent heat-loss by patients in a hospital setting.

2. Description of Relevant Art

Multi-layered materials and articles made from them that provide improved heat insulation without an increase in weight, as compared to conventional textile insulating materials, have been taught in International Patent Application No. PCT/GB99/01910 and its publication as WO 2000/00051, published Jan. 6, 2000, incorporated herein in its entirety by reference. A commercial product called Reflexcell™ material has been successfully used in a line of hypothermia prevention products marketed under the BLIZZARD™ brand, offered by PerSys Medical in Houston, Tex., in the United States of America. Reflexcell™ material has become the new standard wherever thermal performance in a lightweight compact package is essential, including military use, casualty care, emergency preparedness, disaster relief, personal survival and outdoor activities. These products are widely favoured over conventional textile insulating materials for protecting an injured or incapacitated person against the effects of cold, especially out-of-doors.

While the need to protect injured persons from cold in outdoor emergencies is readily apparent, persons need help in staying warm in other situations as well. For example, the perioperative period for a patient in a hospital, that is, the time surrounding a patient's surgical procedure, including the period in the hospital before surgery as well as during the operation and afterwards, is one example of a time where close monitoring of a patient's temperature is needed. Nearly all patients experience reduced body temperature to some degree during surgery due to loss of body heat, while under anesthesia, that a body can't replace fast enough.

To prevent perioperative hypothermia, a patient is typically provided with covers such as sheets and blankets. If needed, healthcare providers may place a "forced air warming" blanket over a patient into which warm air is blown to help prevent the patient from getting too cold. However, such "forced air warming" "blankets" or more accurately called "devices," while helpful in keeping patients warm, are known to have negative side effects. Some of the possible dangers associated with "forced air warming" devices include: deep joint infections; burns caused by prolonged exposure to heat; and increased airborne particles near the surgical site due to movement of non-sterile air and consequent higher risk for complications resulting from contamination.

Better ways of keeping patients warm in hospitals are needed.

SUMMARY

The present invention provides a multi-layer thermal insulating material and a method of using it for keeping persons warm by helping those persons lose less or retain more of their own body heat, particularly in hospital settings where the patients have a high risk of developing hypothermia, such as perioperative hypothermia. The material of the present invention has particular utility in blankets, hospital gowns and thermal wraps. In one embodiment, the thermal insulating material of the present invention comprises at least first and second layers of a primary material and at least one elastic element. In one embodiment, the primary material comprises a nonwoven textile (fabric) or a polymer laminate. In another embodiment, the primary material further comprises at least one layer of a nonwoven textile, and at least one layer of a polymer laminate which can comprise the second layer or a third layer of the primary material when at least the first layer comprises a nonwoven textile. The first and second layers of primary material are arranged with respect to the elastic element so that the insulating material can change between a first configuration in which the elastic element is stretched such that the primary material lies adjacent the elastic element, and a second configuration in which the primary material is bowed with respect to the elastic element so as to form at least one cavity.

BRIEF DESCRIPTION OF THE DRAWINGS

Embodiments of the invention will now be described in detail, by way of example, and with reference to the accompanying drawings, wherein.

DETAILED DESCRIPTION

The present invention provides unique ways of keeping patients in hospitals warm. The present invention particularly provides a method of preventing perioperative hypothermia before, during and after surgery. And the present invention provides a thermal insulating material that is used for making hospital blankets, hospital gowns, thermal wraps, and the like that can cover a patient to realize the advantages of the present invention.

According to a first aspect of the present invention, there is provided an insulating material, comprising first and second layers of primary material arranged to opposite sides of at least one elastic element, such that the insulating material can change between a first configuration wherein the at least one elastic element is stretched such that the at least one layer of primary material lies adjacent the at least one elastic element, and a second configuration wherein the at least one layer of primary material is bowed with respect to the at least one elastic element so as to form at least one cavity wherein air is trapped, increasing the thermal resistance of the assembly.

The thermal insulating material of this invention is quieter to handle and softer to the touch than prior art insulating materials with a similar form of construction, such as, for example, the material described in International Patent Application No. PCT/GB99/01910, published as WO00/00051 of Derek Ryden, as will be discussed further below. The composite form of the primary material comprising the thermal insulating material of the invention contributes to this improvement.

At least one of the layers of primary material is a nonwoven textile. The nonwoven textile is advantageously a bicomponent co-extruded spunbond material containing high and low melting point polymers. In one embodiment, that nonwoven material is made from or comprises polypropylene (for the nonwoven polymer core layer of the fibres) and polyethylene (for the outside surface or textile coating of the fibres), and is designed to be easily heat-sealable to polyethylene while retaining its structural integrity. The textile coating may comprise a set of fibers which are capable of forming a heat-welded bond with the polymer layer, and an additional set of fibers which are able to retain their tensile strength at temperatures used to heat seal the set of fibers to the polymer layer.

At least one layer of the primary material can be in the form of a sheet. In one embodiment, one or each sheet can include a silver-coloured coating, such as a coating of silver-coloured metal, particularly aluminium, applied by vacuum deposition. Alternatively, the coating may be a silver-coloured ink. The coating is preferably broken-up and discontinuous on the surface. This ensures that there is no large-scale path for the conduction of electricity over the film.

The elastic element or the material of the elastic element(s) can be a thread that comprises a yarn having an elastomeric core and a textile coating. The elastomeric core can be a non-latex-containing elastomer, such as, for example, elastane or spandex. The textile coating is preferably a single component, comprised for example of a relatively high melt component. In another embodiment, a low melt component might also be used.

Preferably, the primary material acts to provide protection against water penetration and/or airflow, and the elastic element acts to cause the layers of primary material to move apart from one another or to become bowed with respect to one another in order to form insulating pockets of air between the layers. The primary material can be air and/or water vapour permeable. This can help avoid build-up of moisture due to condensation.

The primary material may have at least one of the following properties: it is light, it is thin, it is substantially waterproof, it is flexible, it reflects heat, and it is permeable to air. From a second aspect, the invention provides an article made wholly or partly from an insulating material that embodies the invention as defined from its first aspect. Examples of such articles include (but are not limited to) a blanket, a garment and a sleeping bag. The attachments between the primary material and the elastic element may be made so as to directly bond the materials to one another. Alternatively, the attachments may hold the materials in the spaced apart relationship. Mechanical fasteners may be used, as may adhesives. Furthermore, heat may be applied to the materials to cause them to melt or fuse together at the attachment points.

In one embodiment of the present invention, layers of primary material are placed adjacent to layers of elastic material (also called an elastic element herein) in an alternating manner, the elastic material being in a state of tension. The layers are then attached to one another at spaced-apart attachment points. Once the tension is released, the elastic layers contract thereby causing the spaced-apart attachment points to move nearer to one another. This in turn causes the primary material to bow between the attachment points thereby giving rise to the creation of chambers which impede the flow of air within the material and hence provide insulation.

Advantageously, the elastic material (or elastic element) is provided in the form of strips arranged parallel to one another. This has the effect of controlling the degree of tension required (per unit width) to stretch the insulating material to its maximally stretched configuration.

At least one layer of elastic material (or elastic element) may be interposed between the first and second sheets of a primary material, the elastic material being resiliently deformable such that the insulating material can change between a first configuration wherein the first and second sheets of primary material are separated from each other by a first distance to a second configuration, wherein at least portions of the first and second sheets of primary material become separated from each other by a distance greater than the first distance.

Referring now to the Figures, a first embodiment of the present invention, as illustrated in FIGS. 1, 2, 3, and 4, comprises first, second, and third sheets, 2, 4, 6 respectively, of primary material.

The inner and the outer (or first and third) sheets 2, 6 are comprised of a primary material comprising bicomponent coextruded nonwoven textile, that includes polypropylene and polyethylene. For example, in one embodiment, the polypropylene forms the core of the textile fibres and the polyethylene forms the outside surface of the fibres and this outside surface is heat-sealable to the core of the textile fibres without loss of structural integrity.

The second sheet (or middle sheet), sheet 4, is comprised of a primary material comprising a laminate wherein the laminate is a polymer laminate comprising three layers of polymer film: 1. Polyethylene; 2. Metallised Polyethylene Terephthalate PET); and 3. Polyethylene. This second sheet 4 may be perforated to allow for water vapour transmission.

The first sheet 2 is attached to the second sheet 4 at regular, spaced-apart intervals, in one embodiment by parallel linear strips of adhesive 8 or in another embodiment by heat sealing. Similarly, the second and third sheets 4 and 6 are attached to each other at regular intervals, in one embodiment by parallel linear strips of adhesive 10 or in another embodiment by heat sealing. The strips of adhesive 8 and 10 run parallel to one another and are offset with respect to one another, in one embodiment by a distance substantially equal to half the interval between the strips 8 that interconnect the first and second sheets 2 and 4 respectively.

A plurality of parallel elastic elements, for example in the form of elastic filaments 12, are disposed at regular intervals between the first and second sheets 2 and 4. The filaments 12 run perpendicular to the longitudinal direction of the strips of adhesive 10. Similarly, a further set of parallel elastic elements 14 are disposed at regular intervals between the second and third sheets 4 and 6, respectively. These filaments run parallel to the first group of filaments 12, have an inter-filament interval substantially the same as that of those filaments between the first and second sheets, and are offset with respect to those filaments by substantially half the inter-filament interval.

In one embodiment, the filaments 12, 14 are in the form of a yarn comprising an elastomeric core with a textile covering. The core is a non-latex-containing elastomer, such as, for example, elastane (or spandex). The filaments 12 and 14 are attached to the adjacent sheets 2, 4, 6 by the strips of adhesive 8 and 10 at those regions where the filaments intercept the strips of adhesive or by heat sealing the low-melting-point fibres to the sheets.

Figure 1:
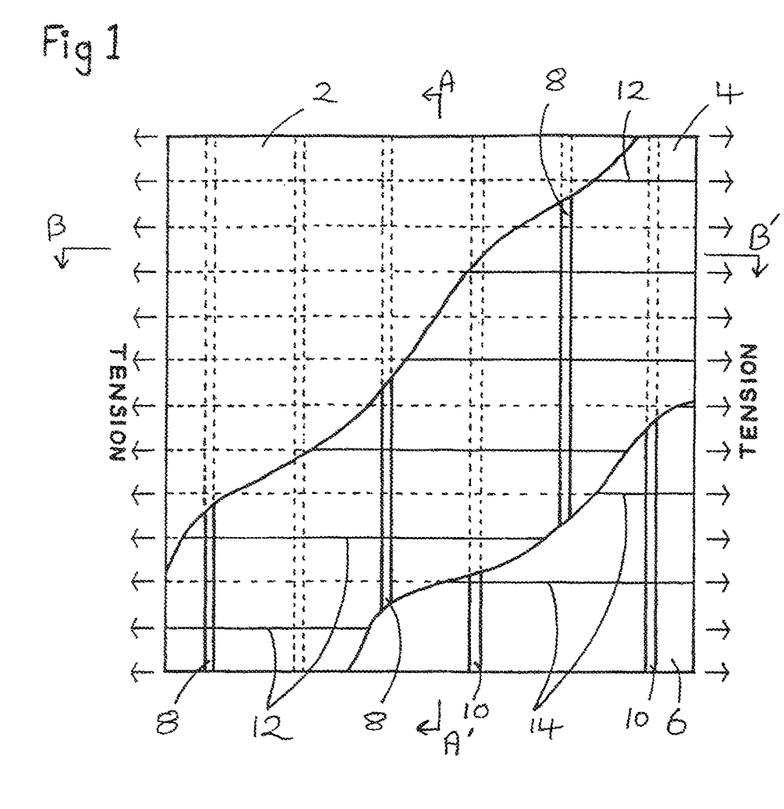
FIG. 1 is a cut-away plan view through an insulating material constituting a first embodiment of the present invention.
Figure 2:
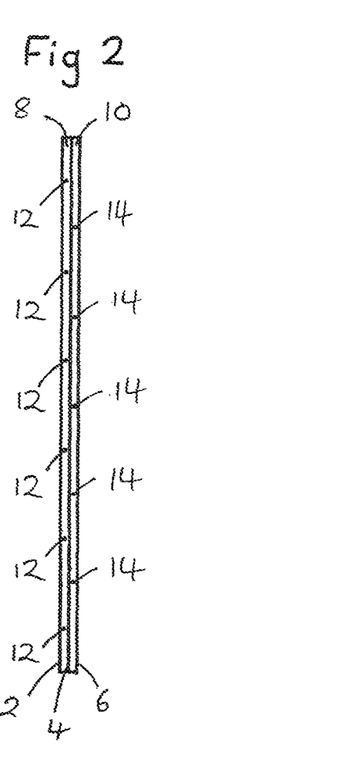
FIG. 2 is a cross-section through the embodiment shown in FIG. 1 along the line A-A'.
Figure 3:
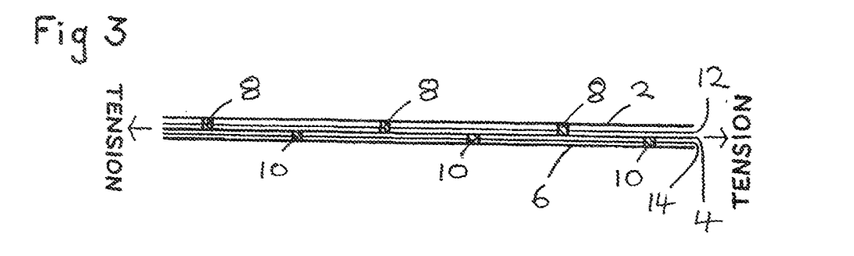
FIG. 3 is a cross-section through the embodiment shown in FIG. 1 along the line B-B'.
Figure 4:
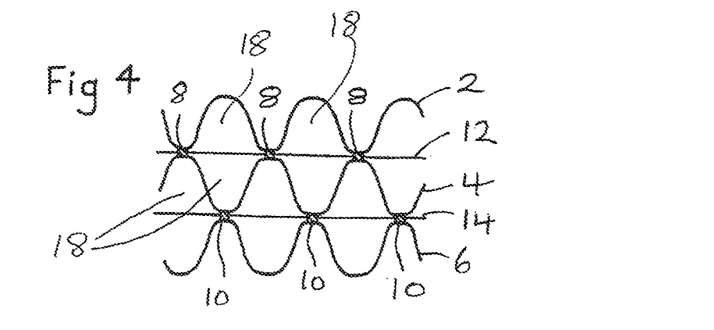
FIG. 4 is a cross-section along the line B-B' when the tension in the material has been released, allowing it to obtain its operating state.
Figure 5:
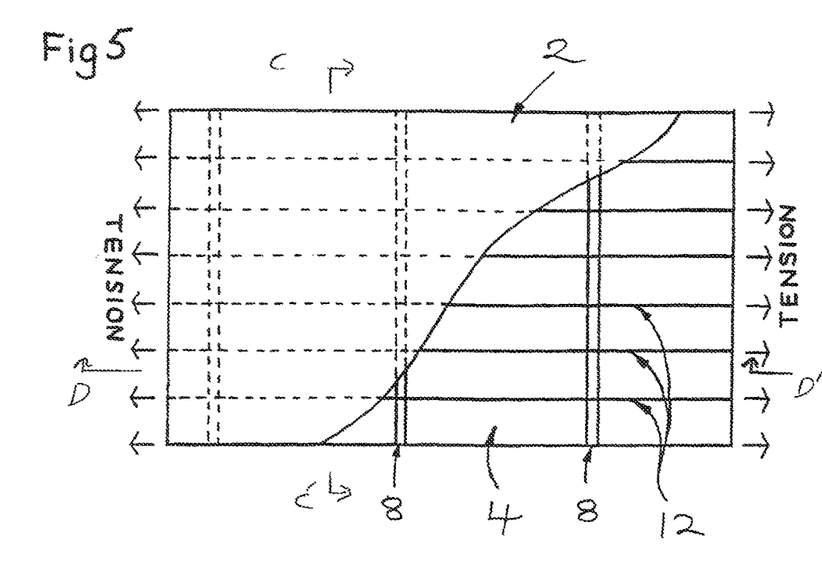
FIG. 5 is a cut-away plan view through an insulating material constituting a second embodiment of the present invention.
Figure 6:
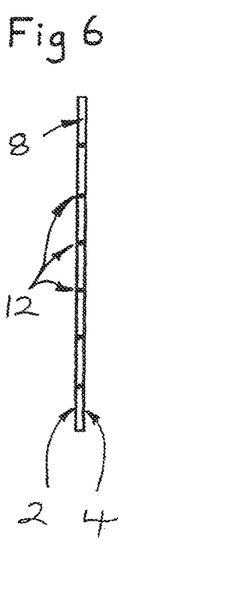
FIG. 6 is a cross section along the line C-C' of FIG. 5.

The filaments 12 and 14 are arranged such that they are under tension when the sheets 2,4 and lie parallel to one another, as shown in FIG. 3. This corresponds to the configuration of the material during manufacturing. When the tension is released, the filaments 12 and 14 contract, thereby reducing the distance between adjacent adhesive strips to less than the width of the first, second or third sheets of material between the adhesive strips, causing the sheets to become bowed, as shown in FIG. 4, and thereby causing the creation of cavities 18. In use, these cavities 18 trap air between the adjacent sheets 2, 4 and 6, and this entrapped air provides a relatively efficient insulator.

A second embodiment of the present invention is illustrated in FIGS. 5 through 8. The second embodiment is similar to the first embodiment, but only comprises first and second sheets, 2 and 4, respectively. These sheets are attached to one another at spaced-apart, regular intervals by parallel linear strips of adhesive 8 or by heat sealing. As with the first embodiment, a plurality of elastic elements, for example in the form of rubber filaments 12, traverse the material under tension, in a direction such that the longitudinal axes of the rubber filaments are perpendicular to the direction of the adhesive strips. The rubber filaments 8 are attached to the sheets 2 and 4 by the adhesive at the points of intersection between the filaments and the adhesive strips.

Figure 7:
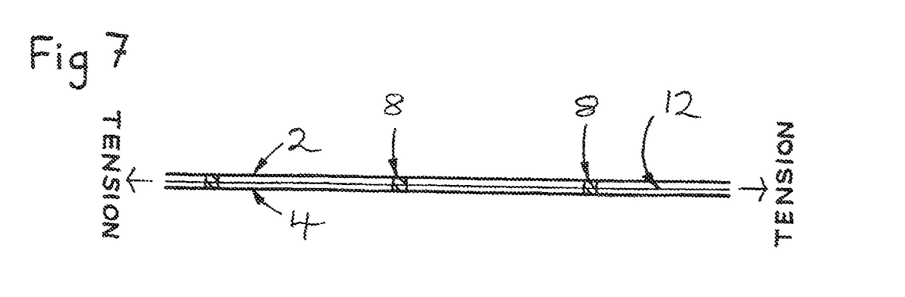
FIG. 7 is a cross section along the line D-D' of FIG. 5.
Figure 8:
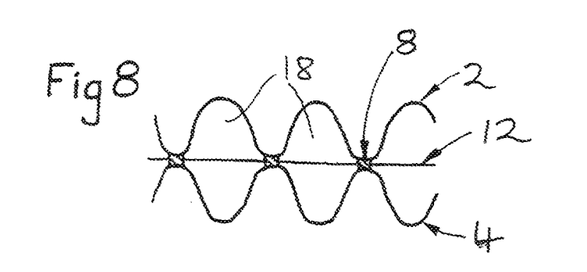
FIG. 8 is a view along the line D-D' of FIG. 5 when the insulating material is in its operating state.

As with the first embodiment, the material can move between two configurations, as shown in FIG. 7, wherein the first and second sheets 2 and 4 respectively, of primary material are substantially parallel to one another and the thickness of the material is minimised, to a second configuration as shown in FIG. 8 wherein the tension is released from the filaments 12 and these cause the first and second sheets to take a bowed or corrugated configuration thereby entraining pockets of air 18 between the sheets.

Persons of ordinary skill will appreciate that modifications can be made to the embodiments within the scope of the invention. For instance, the linear strips of adhesive may be replaced by other adhesive patterns, for example spots of adhesive in a regular pattern or a regular array or more complex geometric patterns of adhesive. As a further alternative, intersecting lines of adhesive may be provided. Similarly, the elastic elements are not restricted to being essentially one-dimensional filaments running parallel to one another, but other more complex shapes may be used such as an intersecting square or triangular grid of filaments, or other shapes which may involve the deposition of individual filaments into the material or may be formed by punching holes out of a sheet of elastic material.

The insulating material may be manufactured in a number of ways. International Patent Application No. PCT/GB99/01910, published as WO00/00051 of Derek Ryden, and United Kingdom Patent Application No. 1618420.2 of Blizzard Protection Systems Ltd, describe manufacturing techniques that are suitable for insulating material of this invention, and those references are incorporated by reference in their entirety herein. The materials those references describe have some common elements to the invention described herein, but the present invention is distinguished by its non-obvious details and unique composition, and particularly with respect to the utility of the present invention in preventing perioperative hypothermia in hospital patients.

The insulating material of the present invention has unique design, components, features, that make it particularly effective in preventing heat loss by patients in a hospital setting. The insulating material of the present invention is not only effective at helping the patient prevent heat loss, but is comprised of components that will not interfere with equipment used in surgery or with other equipment needed for patient care. The insulating material of the present invention, when used as a textile for blankets, hospital gowns, and thermal wraps, has a soft, comfortable texture that patients will appreciate and that in itself can provide comfort to the patient along with the comfort of staying warm that the insulating material of the invention provides.

For simplicity, the method of manufacture will be described herein below with respect to the second embodiment since this is structurally simpler than the first embodiment.

Figure 9:
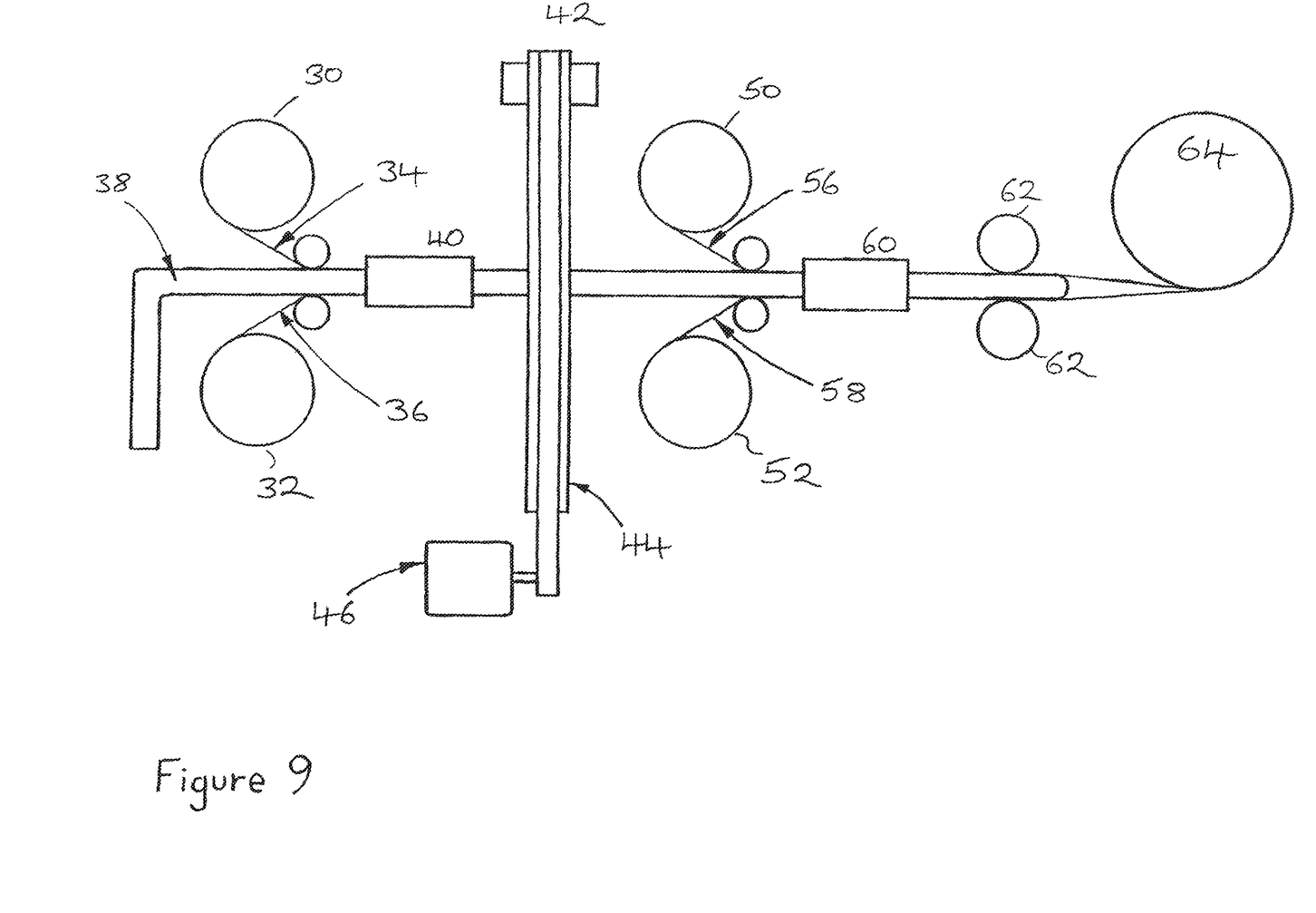
FIG. 9 schematically illustrates a first arrangement for manufacture of the insulating material.

An apparatus for the manufacture of the material is schematically illustrated in FIG. 9. The apparatus is arranged to form the insulating material in a continuous tube. Rolls 30 and 32 hold continuous sheets of the primary material, which will be used to form the innermost skin of the tube. The sheets of the material 34 and 36 are pulled from the rolls 30 and 32 respectively, and caused to run against the upper and lower surfaces of a cantilevered former 38. A joining station 40, for example in the form of a tape dispenser serves to seal the edges of the sheets 34 and 36 together thereby forming a tube of material. The tube then passes through a processing station 42 which serves to dispose the elastic filaments around the tube. The processing station 42 comprises a rotating annulus 44 driven by a motor 46. The rotating annulus 44 encircles the cantilevered former 38. The processing station 42 wraps an elastic filament around the tube of primary material in a helical fashion as the tube advances through the rotating annulus 44. Rollers 50 and 52 hold further layers of primary material which serve to form the top and bottom sheets 56 and 58 of the outermost skin of the tube. The sheets 56 and 58 are disposed against the tube prior to it passing through a second joining station 60 which seals the edges of the sheets 56 and 58 together. Thus far, the apparatus has formed two coaxial tubes of primary material, with the innermost tube being helically overwound by an elastic filament. The material is then passed between heated ribbed rollers 62 which form narrow longitudinal seams joining the inner and outer layers of primary material. The finished material is then wound onto a roll 64 for storage.

In an alternative arrangement to that described, the longitudinal seams joining the inner and outer layers together may alternatively be produced using adhesive, for example, by precoating the outer surface of the inner layer of primary material, or the inner surface of the outer layers of primary material, with continuous strips of contact adhesive such that the seams are formed when the inner and outer layers of primary material come into contact with one another.

Figure 10:
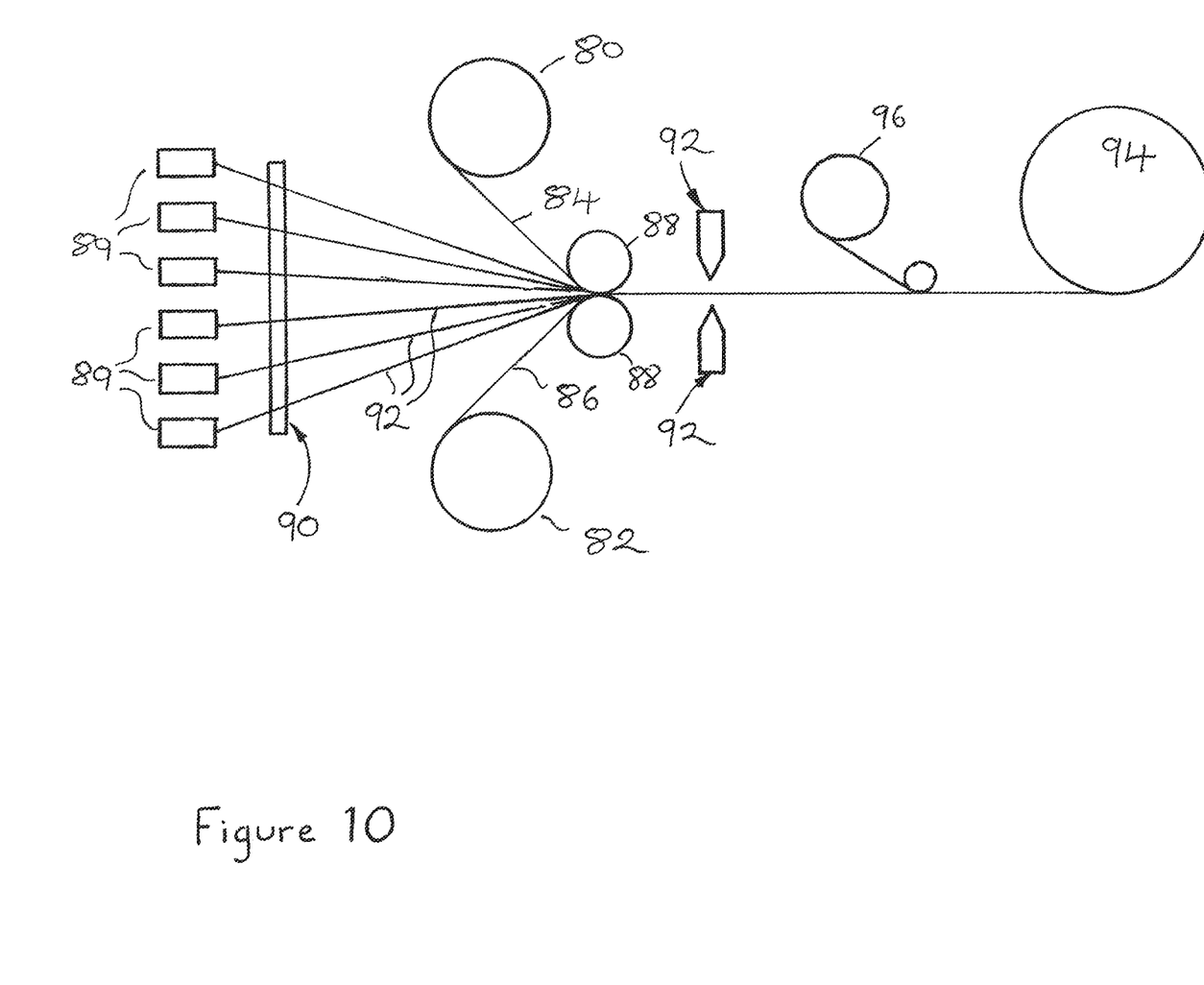
FIG. 10 schematically illustrates a second arrangement for manufacturing the insulating material.

A second method of manufacture is schematically illustrated in FIG. 10. This method is directed to the manufacture of sheets of material. Spools 80 and 82 hold upper and lower sheets 84 and 86 respectively of primary material. A plurality of spools 89 hold elastic filaments and these are directed through a tensioning and guide arrangement 90 such that the elastic filaments 92 are sandwiched between the upper and lower sheets of primary material 84 and 86 as the insulating material is drawn between powered rollers 88. Thus, the filaments run parallel to the longitudinal axis of the sheet of insulating material and are disposed at regular intervals across the width of the material. The material then passes between a pair of reciprocating heated elements 92 which form transverse, heat-welded seams at regular intervals along the material. The material is then wound on to a storage roll 94.

A further method of manufacture can involve introducing parallel corrugations into the sheets prior to attaching these to sheets of elastic material, the elastic material being in a non-tensioned or reduced tension configuration.

Other fastenings, for example stitching or rivets, may be used in place of the adhesive or heat-welding to hold the layers together.

The material may be employed in the construction of blankets, thermal wraps, hospital gowns and other garments. Using the material of the invention for blankets, thermal wraps, and hospital gowns facilitates use of the material as a cover for patients in hospital settings. This cover helps the patients retain body heat, or helps the patients lose less body heat or lose body heat slower, in turn helping prevent the patients from become hypothermic. The garment may have an inner surface to which are attached a number of heat-emitting pads designed to release heat at a temperature suitable for warming the wearer or user. The heat-emitting pads may employ a chemical reaction involving the oxidation of iron powder in the presence of air. This utility is not limited to hospital settings but is especially appreciated in hospitals because perioperative hypothermia is a condition which patients in hospitals are particularly vulnerable.

While preferred embodiments of the present disclosure have been described, it should be understood that various changes, adaptations and modifications can be made therein without departing from the spirit of the invention(s) as claimed below.

What is claimed is:

1. A thermal insulating material, comprising at least first and second layers of primary material and at least one elastic element;
    wherein, the first and second layers of primary material are arranged to opposite sides of the at least one elastic element, such that the thermal insulating material can change between a first configuration in which the at least one elastic element is stretched such that at least one of the at least first and second layers of primary material lies adjacent the at least one elastic element, and a second configuration in which the at least one of the at least first and second layers of primary material is bowed with respect to the at least one elastic element so as to form at least one cavity,
    wherein the at least one of the at least first and second layers of primary material is a polymer layer comprising a co-extruded bicomponent spunbound nonwoven textile having a reflective coating comprising metal,
    wherein the reflective coating is discontinuous on a surface of the at least one of the at least first and second layers of primary material.

2. The thermal insulating material of claim 1 further comprising a plurality of layers of primary material and a plurality of layers of elastic elements arranged in an alternating fashion.

3. The thermal insulating material of claim 1 wherein the at least one elastic element comprises a thread that comprises a yarn having an elastomeric core and a textile coating.

4. The thermal insulating material of claim 3 wherein the elastomeric core is a non-latex-containing elastomer.

5. The thermal insulating material of claim 4 wherein the elastomeric core is elastane.

6. The thermal insulating material of claim 1 wherein the at least one of the at least first and second layers of primary material has the form of a sheet.

7. The thermal insulating material of claim 1 wherein the at least one elastic element has the form of a sheet.

8. The thermal insulating material of claim 1 wherein the at least one elastic element is provided as an array of filaments or strips.

9. The thermal insulating material of claim 1 wherein the at least one elastic element has the form of a net or a mesh.

10. The thermal insulating material of claim 9 wherein the at least one of the at least first and second layers of primary material has spaced apart attachment regions for attaching the at least one elastic element, and wherein the at least one elastic element is attached to the at least one of the at least first and second layers of primary material at said spaced apart attachment regions.

11. The thermal insulating material of claim 10 further comprising a third layer of primary material, and wherein the first and second layers of primary material have attachment regions for attaching the at least one elastic element between them, and wherein the second and third layers of primary material have attachment regions for attaching the at least one elastic element between them, and wherein the at least one elastic element is disposed between the first and second layers of primary material and between the second and third layers of primary material, and wherein the attachment regions of the first and second layers are offset with respect to the attachment regions of the second and third layers.

12. The thermal insulating material of claim 11 wherein the attachment regions of the first and second layers or the attachment regions of the second and third layers are arranged in a regular array.

13. The thermal insulating material of claim 1 wherein the at least one of the at least first and second layers of primary material and the at least one elastic element are attached together by mechanical attachment, heat sealing or adhesive attachment.

14. The thermal insulating material of claim 1 wherein the at least one elastic element is resiliently deformable, such that the thermal insulating material can change between the first configuration wherein the at least first and second layers of primary material are separated from each other by a first distance, and the second configuration wherein at least portions of the first and second layers of primary material become separated from one another by a distance greater than the first distance.

15. The thermal insulating material of claim 1 in which not all layers of primary material are of the same composition.

16. The thermal insulating material of claim 15 wherein the at least one of the at least first and second layers of primary material comprises a heat-sealable polymer film.

17. The thermal insulating material of claim 15 wherein the at least one of the at least first and second layers of primary material comprises low-density polyethylene.

18. An article of clothing made wholly or partly from the thermal insulating material of claim 1.

19. The article of clothing of claim 18 wherein the article of clothing is a hospital gown.

20. A blanket or thermal wrap wholly or partly made from the thermal insulating material of claim 1.

21. A sleeping bag made wholly or partly from the thermal insulating material of claim 1.

22. A blanket, thermal wrap, sleeping bag, hospital gown or other article of clothing wholly or partly made from the thermal insulating material of claim 1 and having an inner surface to which are attached a number of heat-emitting pads designed to release heat at a temperature suitable for warming the wearer or user.

23. The blanket, thermal wrap, sleeping bag, or hospital gown or other article of clothing of claim 22, wherein the heat-emitting pads employ a chemical reaction involving the oxidation of iron powder in the presence of air.

24. The thermal insulating material of claim 1, wherein at least one of the at least first and second layers of primary material is perforated.

25. A method for preventing hypothermia in a person, comprising: covering the patient with the thermal insulating material of claim 1.

26. A thermal insulating material, comprising at least first and second layers of primary material and at least one elastic element;
wherein, the first and second layers of primary material are arranged to opposite sides of the at least one elastic element, such that the thermal insulating material can change between a first configuration in which the at least one elastic element is stretched such that at least one of the at least first and second layers of primary material lies adjacent the at least one elastic element, and a second configuration in which the at least one of the at least first and second layers of primary material is bowed with respect to the at least one elastic element so as to form at least one cavity,
wherein the at least one of the at least first and second layers of primary material is a polymer layer comprising a nonwoven textile,
wherein the at least one elastic element comprises a thread that comprises a yarn having an elastomeric core and a textile coating,
wherein the textile coating comprises a set of fibers which are capable of forming a heat-welded bond with the polymer layer.

27. The thermal insulating material of claim 26 wherein the textile coating comprises an additional set of fibers which are able to retain their tensile strength at temperatures used to heat seal the set of fibers to the polymer layer.

28. The thermal insulating material of claim 26, wherein at least one of the at least first and second layers of primary material is perforated.

29. A thermal insulating material, comprising at least first and second layers of primary material and at least one elastic element;
wherein, the first and second layers of primary material are arranged to opposite sides of the at least one elastic element, such that the thermal insulating material can change between a first configuration in which the at least one elastic element is stretched such that at least one of the at least first and second layers of primary material lies adjacent the at least one elastic element, and a second configuration in which the at least one of the at least first and second layers of primary material is bowed with respect to the at least one elastic element so as to form at least one cavity,
wherein a first of the at least first and second layers of primary material is a polymer layer comprising a nonwoven textile and a second of the at least first and second layers of primary material comprises a laminate of more than one polymer film comprising heat-sealable polyethylene.

30. The thermal insulating material claim 29, wherein at least one of the at least first and second layers of primary material is perforated.

31. The thermal insulating material of claim 29 wherein the laminate comprises three polymer films arranged as an upper film, middle film, and lower film, such that the upper and lower films are heat-sealable polyethylene and the middle film is metallized.

32. The thermal insulating material of claim 31 wherein the middle film comprises a metallized (polyethylene terephthalate (PET) film.

33. A method for preventing perioperative hypothermia in a hospital patient, comprising: covering the patient with the thermal insulating material of claim 32 before, during, and/or after surgery.

34. A thermal insulating material, comprising at least first and second layers of primary material and at least one elastic element;
wherein, the first and second layers of primary material are arranged to opposite sides of the at least one elastic element, such that the thermal insulating material can change between a first configuration in which the at least one elastic element is stretched such that at least one of the at least first and second layers of primary material lies adjacent the at least one elastic element, and a second configuration in which the at least one of the at least first and second layers of primary material is bowed with respect to the at least one elastic element so as to form at least one cavity,
wherein not all layers of primary material are of the same composition and the at least one of the at least first and second layers of primary material is a polymer layer comprising a nonwoven textile,
wherein at least one of the at least first and second layers of primary material is perforated.

35. A thermal insulating material for making hospital blankets, hospital gowns, and thermal wraps, comprising:
a first layer of primary material comprising bicomponent coextruded spunbond nonwoven textile material comprising polypropylene and polyethylene;
an elastic element comprising a non-latex core and a single component high-melt component covering; and
a second layer of primary material comprising a laminate comprising a layer of polyethylene film, a metallized polyethylene terephthalate film, and polyethylene film;
wherein the first layer of primary material is arranged with the elastic element such that the thermal insulating material can change between a first configuration in which the elastic element is stretched such that the first layer of primary material lies adjacent the elastic element, and a second configuration in which the first layer of primary material is bowed with respect to the elastic element so as to form at least one cavity; and wherein the second layer of primary material comprises the outer layer of the hospital blankets, hospital gowns, or thermal wraps, and the first layer of primary material comprise the inner layer of the hospital blankets, gowns, or thermal wraps.

36. A method for preventing perioperative hypothermia in a hospital patient, comprising: covering the patient with a blanket, hospital gown, or thermal wrap comprising the thermal insulating material of claim 35.

* * * * *